(12) United States Patent
Korogi et al.

(10) Patent No.: US 12,333,215 B2
(45) Date of Patent: Jun. 17, 2025

(54) DISPLAY SYSTEM

(71) Applicant: TOYOTA JIDOSHA KABUSHIKI KAISHA, Toyota (JP)

(72) Inventors: Yuto Korogi, Nagakute (JP); Katsuya Shimazu, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 75 days.

(21) Appl. No.: 18/499,577

(22) Filed: Nov. 1, 2023

(65) Prior Publication Data

US 2024/0248675 A1   Jul. 25, 2024

(30) Foreign Application Priority Data

Jan. 19, 2023 (JP) .................. 2023-006495

(51) Int. Cl.
*G06F 3/16* (2006.01)
*B60K 35/00* (2006.01)
*B60K 35/29* (2024.01)

(52) U.S. Cl.
CPC .............. *G06F 3/165* (2013.01); *B60K 35/00* (2013.01); *B60K 35/29* (2024.01); *B60K 2360/18* (2024.01)

(58) Field of Classification Search
CPC ......... G06F 3/165; B60K 35/00; B60K 35/29; B60K 2369/18
See application file for complete search history.

(56) References Cited

U.S. PATENT DOCUMENTS

| | | | |
|---|---|---|---|
| 10,120,438 B2* | 11/2018 | Osman ................... | G06F 1/3265 |
| 2016/0165031 A1* | 6/2016 | Gopinath .............. | H04W 8/005 |
| | | | 455/569.2 |
| 2017/0041709 A1* | 2/2017 | Chang ...................... | H04R 3/12 |
| 2023/0409159 A1* | 12/2023 | Na ......................... | G06F 3/0481 |

FOREIGN PATENT DOCUMENTS

| | | | |
|---|---|---|---|
| JP | 2021-096539 A | 6/2021 | |
| JP | 2022-178102 A | 12/2022 | |

* cited by examiner

*Primary Examiner* — Yassin Alata
(74) *Attorney, Agent, or Firm* — SoraIP, Inc.

(57) ABSTRACT

A display system includes a display, a plurality of speakers, and a control device that controls the display and the speakers. The display is configured to be able to simultaneously display video of main content and video of sub-content. The speakers are configured to output sound of the main content. The control device is configured to stop output of sound from a speaker on a side closer to the sub-content when video of the sub-content is desired to attract a user.

3 Claims, 3 Drawing Sheets

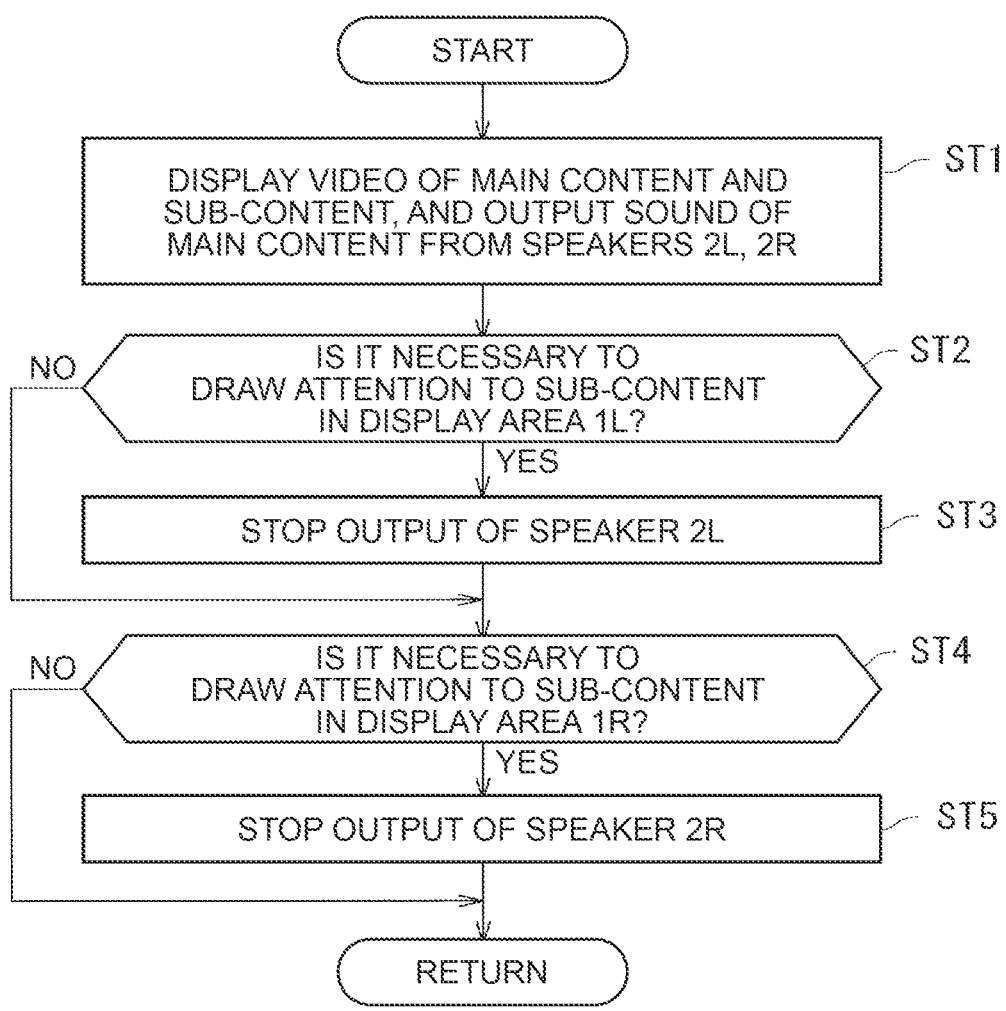

DISPLAY SYSTEM

CROSS-REFERENCE TO RELATED APPLICATION

This application claims priority to Japanese Patent Application No. 2023-006495 filed on Jan. 19, 2023, incorporated herein by reference in its entirety.

BACKGROUND

1. Technical Field

The present disclosure relates to a display system.

2. Description of Related Art

Conventionally, a display system in which video of main content and video of sub-content are simultaneously displayed on a display is known (see, for example, Japanese Unexamined Patent Application Publication No. 2022-178102 (JP 2022-178102A)).

SUMMARY

Here, in the display system as described above, there is a case in which attention is desired to be paid to the sub-content while suppressing obstruction of viewing of the main content.

The present disclosure has been made to solve the above issue, and an object of the present disclosure is to provide a display system that is able to attract attention to sub-content while suppressing obstruction of viewing of main content.

A display system according to the present disclosure includes a display, a plurality of speakers, and a control device that controls the display and the speakers. The display is configured to be able to simultaneously display video of main content and video of sub-content. The speakers are configured to output sound of the main content. The control device is configured to stop output of sound from a speaker on a side closer to the sub-content when video of the sub-content is desired to attract a user.

By stopping the output of the sound from the speaker on the side closer to the sub-content as described above, it is possible to attract attention to the sub-content while suppressing obstruction of viewing of the main content.

In the above display system, the display may include a first display area in which video of the main content is displayed, and a second display area and a third display area in which video of the sub-content is displayed. The second display area may be disposed at a first end portion of the display in a width direction, and the third display area may be disposed at a second end portion of the display in the width direction. The speakers may include a first speaker disposed on the first end portion side of the display in the width direction, and a second speaker disposed on the second end portion side of the display in the width direction. The control device may be configured to temporarily stop output of sound from the first speaker when video of the sub-content of the second display area is desired to attract a user. The control device may be configured to temporarily stop output of sound from the second speaker when video of the sub-content of the third display area is desired to attract a user.

In the above display system, the sub-content may be information related to behavior of a vehicle.

According to the display system of the present disclosure, it is possible to attract attention to the sub-content while suppressing obstruction of viewing of the main content.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 3 is a flowchart for explaining the operation of the display system of this embodiment.

DETAILED DESCRIPTION OF EMBODIMENTS

An embodiment of the present disclosure will be described below.

First, the configuration of the display system 100 according to one embodiment of the present disclosure will be described.

The display system 100 is, for example, applied to a vehicle (not shown) and used by passengers other than the driver. The display system 100 is configured to simultaneously display video of main content and video of sub-content on the display 1. For example, the main content is communication content in the web conference system, and the sub-content is information about vehicle behavior.

Figure 1:
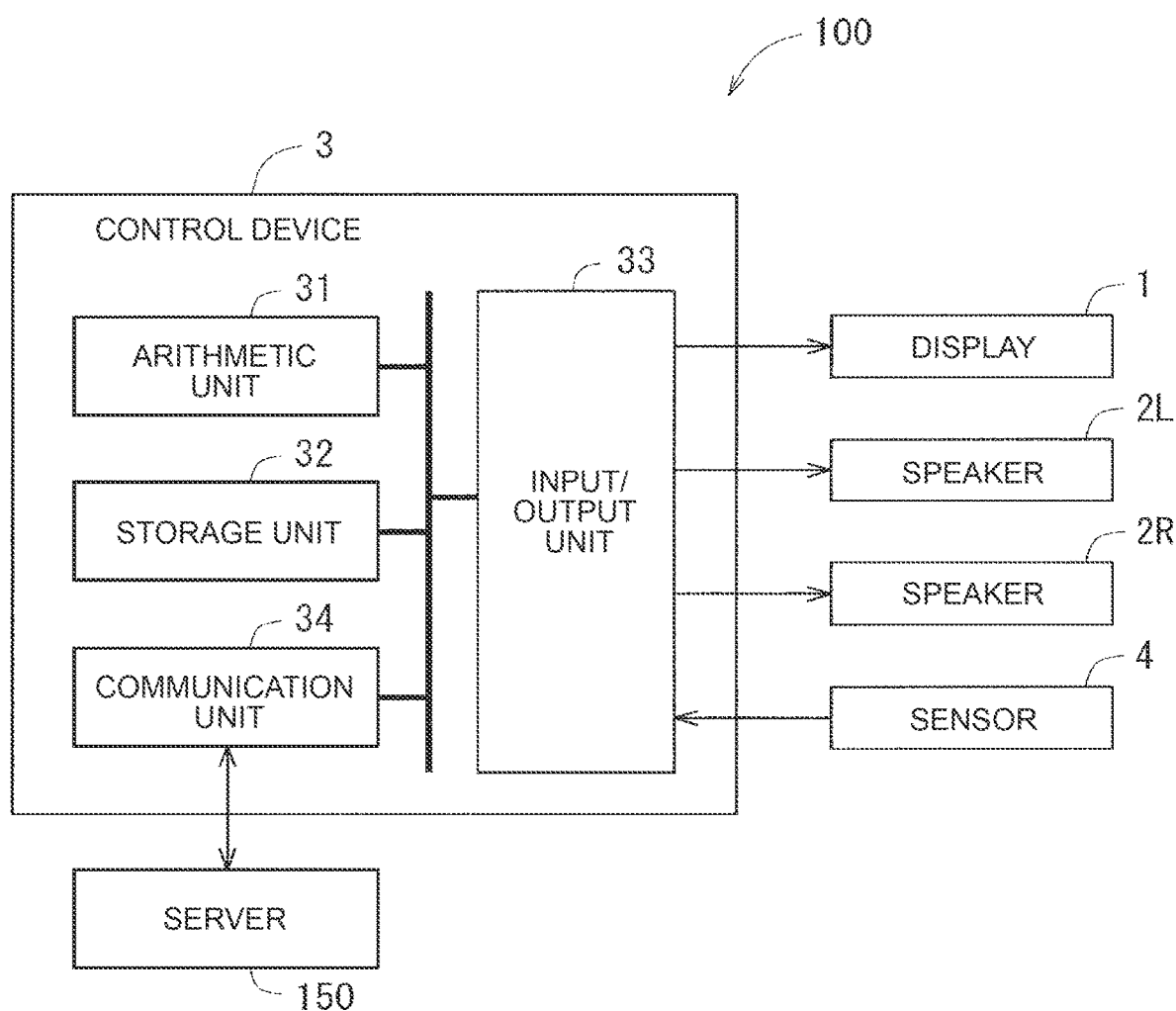
FIG. 1 is a block diagram showing the configuration of the display system of this embodiment.

As shown in FIG. 1, the display system 100 includes a display 1, speakers 2L, 2R, a control device 3, and a sensor 4. That is, the display system 100 is provided with two speakers. The speaker 2L is an example of the "first speaker" in the present disclosure, and the speaker 2R is an example of the "second speaker" in the present disclosure.

Figure 2:
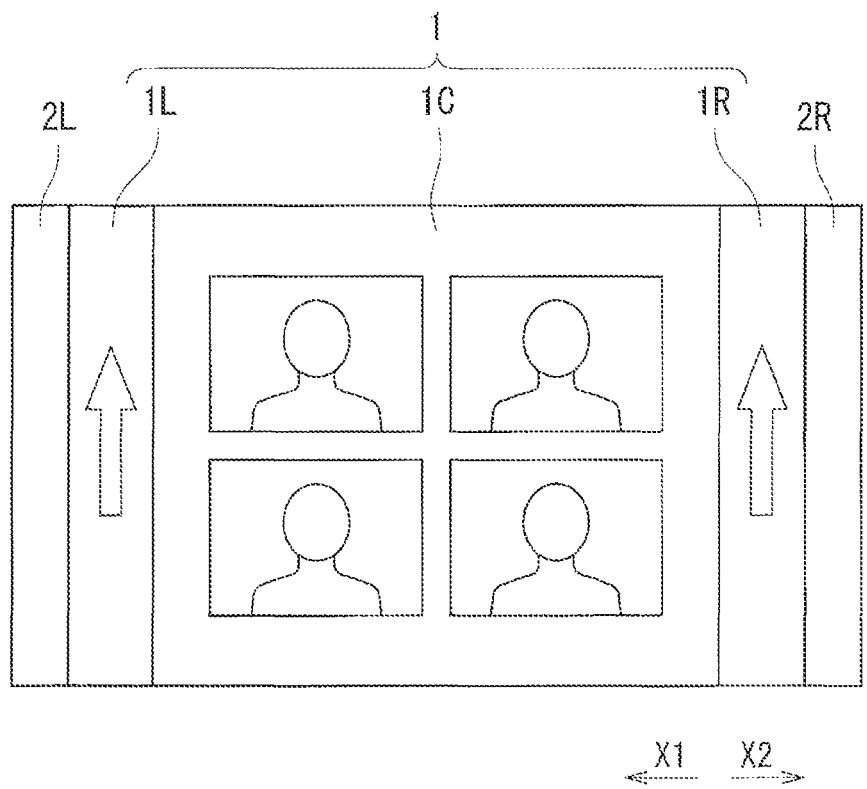
FIG. 2 is a diagram for explaining a display of the display system of FIG. 1.

As shown in FIG. 2, the display 1 is configured to be able to simultaneously display main content video and sub-content video. The display 1 includes a display area 1C, a display area 1L, and a display area 1R. The display area 1C is an example of the "first display area" of the disclosure, the display area 1L is an example of the "second display area" of the disclosure, and the display area 1R is an example of the "third display area" of the disclosure.

The display area 1C is arranged in the center of the display 1 and configured to display video of the main content. For example, a web conference screen is displayed in the display area 1C. The display area 1L is arranged at a first end portion in the width direction of the display 1 (the end on the X1 direction side), and is configured to display video of sub-content. The display area 1R is arranged at a second end portion in the width direction of the display 1 (the end on the X2 direction side), and is configured to display video of the sub-content. Display areas 1L, 1R display, for example, figures indicating the traveling direction of the vehicle.

The speakers 2L, 2R are configured to output the sound of the main content. The speakers 2L, 2R are designed to output, for example, speeches of participants in the web conference system. The speaker 2L is arranged on the first end portion side (X1 direction side) of the display 1 in the width direction. The speaker 2R is arranged on the second end portion side (X2 direction side) of the display 1 in the width direction.

As shown in FIG. 1, the control device 3 includes an arithmetic unit 31, a storage unit 32, an input/output unit 33, and a communication unit 34. A program for controlling the display system 100 and the like are stored in the storage unit 32. The arithmetic unit 31 is configured to control the display system 100 by executing a program stored in the storage unit 32. The input/output unit 33 is connected with the display 1, the speakers 2L, 2R, the sensor 4, and the like. The sensor 4 is configured to detect various types of vehicle information. A communication unit 34 is provided to communicate with the server 150 of the web conference system.

The control device 3 is configured to be able to calculate the behavior of the vehicle based on the detection result of the sensor 4. Also, the control device 3 communicates with the server 150 and functions as a client of the web conference system. The control device 3 is configured to control the display 1 and the speakers 2L, 2R. Specifically, the control device 3 is configured to stop sound output from the speaker 2L or 2R on the side closer to the sub-content when the user wants to be attracted to the video of the sub-content. Note that the user is, for example, a passenger other than the driver.

Motion

Next, operation of the display system 100 will be described with reference to FIG. 3.

First, at ST1 in FIG. 3, the control device 3 displays the main content on the display area 1C of the display 1, and displays the sub-content on the display areas 1L, 1R of the display 1. Also, the control device 3 outputs the sound of the main content from the speakers 2L, 2R.

Next, in ST2, the control device 3 determines whether it is necessary to draw attention to the sub-content in the display area 1L. For example, when a sharp turn to the left is predicted based on the detection result of the sensor 4, it is determined that it is necessary to draw attention to the sub-content in the display area 1L. Then, when the control device 3 determines that it is necessary to draw attention to the sub-content in the display area 1L, the process proceeds to ST3. On the other hand, if the control device 3 determines that there is no need to draw attention to the sub-contents in the display area 1L, the process proceeds to ST4.

In ST3, the control device 3 temporarily stops the sound output from the speaker 2L. The time during which the speaker 2L is muted is set in advance. That is, the output of sound from the speaker 2L is stopped, and the output of the sound from the speaker 2L is resumed after a predetermined period of time has passed. Due to the temporary muting of the speaker 2L, the user's consciousness is turned to the left side, and the sub-contents in the display area 1L are easily visible. Therefore, it becomes easier for the user to grasp changes in the behavior of the vehicle, and the user can prepare himself in advance. After that, the process moves to ST4.

Next, in ST4, the control device 3 determines whether it is necessary to draw attention to the sub-content in the display area 1R. For example, when a sharp turn to the right is predicted based on the detection result of the sensor 4, it is determined that it is necessary to draw attention to the sub-content in the display area 1R. Then, when the control device 3 determines that it is necessary to draw attention to the sub-content in the display area 1R, the process proceeds to ST5. On the other hand, if the control device 3 determines that there is no need to draw attention to the sub-contents in the display area 1R, the process proceeds to RETURN.

In ST5, the control device 3 temporarily stops the sound output from the speaker 2R. The time during which the speaker 2R is muted is set in advance. That is, the output of sound from the speaker 2R is stopped, and the output of sound from the speaker 2R is restarted after a predetermined time has passed. By temporarily muting the sound of the speaker 2R, the user's consciousness is directed to the right side, and the sub-contents in the display area 1R are easily visible. Therefore, it becomes easier for the user to grasp changes in the behavior of the vehicle, and the user can prepare himself in advance. After that, the process moves to RETURN.

Effect

In the present embodiment, as described above, the output of sound from the speaker 2L is stopped when it is desired to attract the user to the sub-content in the display area 1L, and the output of sound from the speaker 2R is stopped when it is desired to attract the user to the sub-content in the display area 1R. By configuring in this way, it is possible to direct attention to the sub-content while suppressing obstruction of viewing of the main content. Therefore, it is possible to easily inform the user of changes in the behavior of the vehicle while suppressing obstruction to viewing of the main content.

Other Embodiments

In addition, the embodiment disclosed this time is an example in all respects, and does not serve as a basis for a restrictive interpretation. Therefore, the technical scope of the present disclosure is not to be interpreted only by the above-described embodiments, but is defined based on the claims. In addition, the technical scope of the present disclosure includes all modifications within the meaning and range of equivalence to the claims.

For example, in the above embodiments, the display system 100 is applied to a vehicle. The display system is not limited to this, and may be applied to other than vehicles.

Moreover, in the above embodiment, an example in which two speakers are provided has been shown. The present disclosure is not limited to this, and three or more speakers may be provided.

Further, in the above embodiment, an example is shown in which the main content is communication content in the web conference system. The main content is not limited to this, and may be a movie or the like.

Also, in the above embodiment, an example was shown in which the sub-content is information about the behavior of the vehicle. The sub-content is not limited to this, and may be information to be notified to the user other than the information regarding the behavior of the vehicle.

Further, in the above-described embodiment, an example was shown in which the display 1 includes the display area 1C in which video of the main content is displayed, and the display areas 1L, 1R in which video of the sub-content is displayed. The present disclosure is not limited to this, and a display on which video of the main content is displayed and a display on which video of the sub-content is displayed may be separately provided.

Further, in the above-described embodiment, an example is shown in which two display areas are provided in which video of sub-content is displayed. The present disclosure is not limited to this, and the number of display areas in which video of sub-content is displayed may be any number.

Further, in the above-described embodiment, an example was shown in which the sub-content in the display area 1L and the sub-content in the display area 1R are the same. Not limited to this, the sub-content in the display area 1L and the sub-content in the display area 1R may be different.

Also, in the above embodiment, an example in which sub-contents are always displayed has been shown. Alternatively, the sub-content may be displayed when the speaker is muted to attract the user's attention.

The present disclosure can be used for a display system that simultaneously displays video of main content and video of sub-content on a display.

What is claimed is:

1. A display system comprising:
a display;
a plurality of speakers; and
a control device that controls the display and the speakers, wherein
the display is configured to be able to simultaneously display video of main content and video of sub-content,
the speakers are configured to output sound of the main content, and
the control device is configured to stop output of sound from a speaker on a side closer to the sub-content when video of the sub-content is desired to attract a user.

2. The display system according to claim 1, wherein:
the display includes a first display area in which video of the main content is displayed, and a second display area and a third display area in which video of the sub-content is displayed;
the second display area is disposed at a first end portion of the display in a width direction;
the third display area is disposed at a second end portion of the display in the width direction;
the speakers include a first speaker disposed on the first end portion side of the display in the width direction, and a second speaker disposed on the second end portion side of the display in the width direction;
the control device is configured to temporarily stop output of sound from the first speaker when video of the sub-content of the second display area is desired to attract a user; and
the control device is configured to temporarily stop output of sound from the second speaker when video of the sub-content of the third display area is desired to attract a user.

3. The display system according to claim 1, wherein the sub-content is information related to behavior of a vehicle.

* * * * *